United States Patent [19]

Pataki, nee Nagy et al.

[11] 3,960,630
[45] June 1, 1976

[54] PROCESS AND APPARATUS FOR THE PRODUCTION OF WOUND SANDWICH STRUCTURES

[75] Inventors: Zsuzsa Pataki, née Nagy; Ferenc Windisch; Jozsef Nagy; Géza Kecskeméthy; György Virág, all of Budapest, Hungary

[73] Assignees: Muanyagipari Kutato Intezet; Fovarosi Muanyagipari Vallalat, both of Budapest, Hungary

[22] Filed: July 22, 1974

[21] Appl. No.: 490,884

[30] Foreign Application Priority Data
July 25, 1973 Hungary .............................. MU 505

[52] U.S. Cl. ................................ 156/190; 138/144; 138/153; 156/191; 156/450; 242/7.02; 242/7.21
[51] Int. Cl.² ...................... B65H 81/00; B31C 9/00
[58] Field of Search ................. 156/65, 70, 91, 166, 156/171, 172, 173, 187, 188, 190, 191, 192, 195, 265, 297, 299, 431, 434, 450, 475, 494, 519, 552, 564, 572; 242/7.02, 7.03, 7.21, 7.22, 7.23; 138/144, 153; 93/80; 52/249; 214/8.5 F; 221/268, 270; 428/36

[56] References Cited
UNITED STATES PATENTS

| | | | |
|---|---|---|---|
| 1,883,113 | 10/1932 | Titchener | 156/297 |
| 2,877,150 | 3/1959 | Wilson | 156/195 |
| 3,226,910 | 1/1966 | Steffey | 156/302 |
| 3,376,185 | 4/1968 | Snook et al. | 156/265 |
| 3,436,290 | 4/1969 | Reissner | 156/195 |
| 3,676,246 | 7/1972 | Grosh | 156/188 |
| 3,706,615 | 12/1972 | Nishiyama et al. | 156/171 |
| 3,788,918 | 1/1974 | Poulsen | 156/171 |

FOREIGN PATENTS OR APPLICATIONS
787,277   12/1957   United Kingdom................. 156/192

*Primary Examiner*—William A. Powell
*Assistant Examiner*—J. J. Gallagher

[57] ABSTRACT

The invention relates to a process and an apparatus for the production of wound sandwich structures, wherein the inner shell, made of a glass-reinforced plastic, is prepared in a known way, then solid core elements are wound onto the inner shell, and finally an outer shell, made of a glass-reinforced plastic, is formed on the wound core. Thus rigid articles (e.g. containers), consisting of inner and outer shells of glass-reinforced plastic and a core of wound core elements, are obtained. The core elements are wound up by forwarding the individual elements directly one after another onto a thread which carries the core elements, presses them onto the rotating mandrel, and is also wound up, or by forming a flexible band by adhesion, from the core elements and the carrier thread or band, and this flexible band is wound up. The inner and outer shells, and the surface of the core material are prepared preferably on a conventional winding machine, provided with auxiliary equipments according to the invention.

The wound sandwich structures prepared according to the invention are several times higher in mechanical strength than the articles made by the known techniques.

7 Claims, 13 Drawing Figures

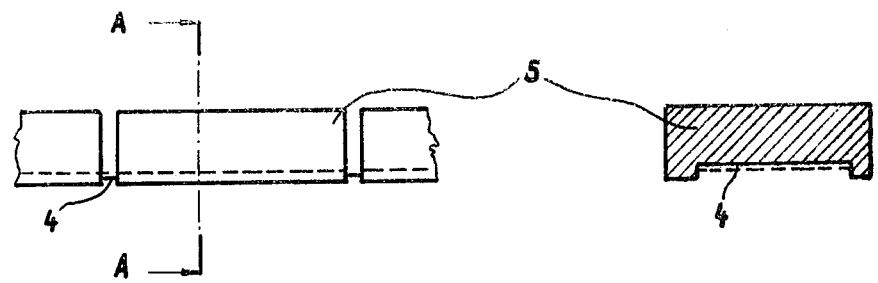
Fig. 2    Fig. 2a
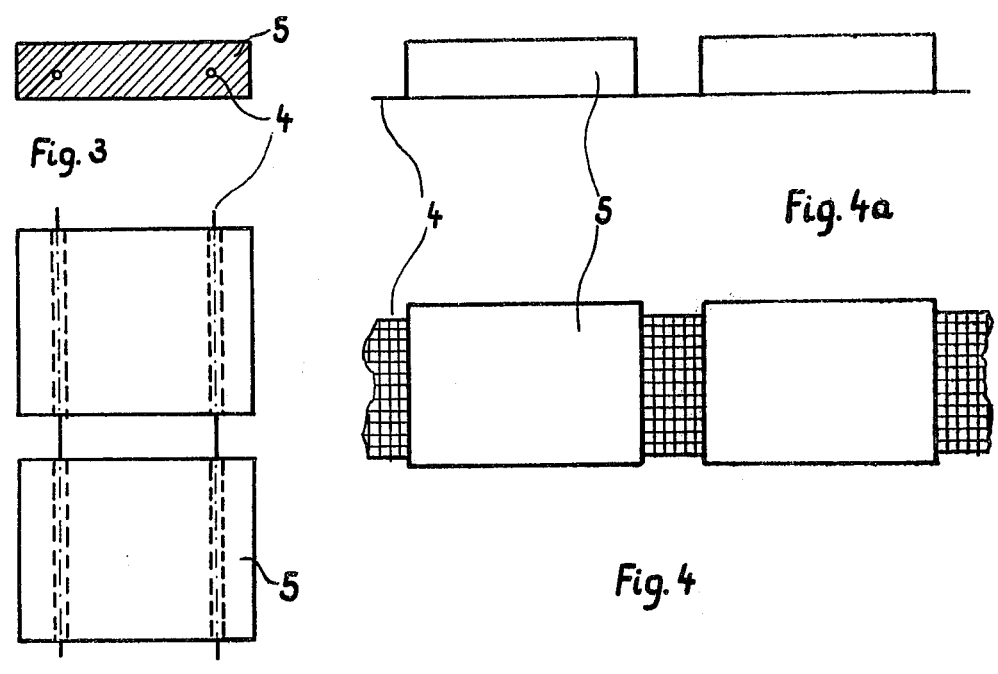
Fig. 3
Fig. 3a
Fig. 4a
Fig. 4

PROCESS AND APPARATUS FOR THE PRODUCTION OF WOUND SANDWICH STRUCTURES

This invention relates to a process and an appraratus for the production of would sandwich structures made of glass-fibre reinforced plastics.

As known, filament would structures with various shapes and dimensions, mainly tubes and containers can be prepared from glass-fibre reinforced plastics, primarily glass-fibre reinforced polyester resins. In these processes a roving, i.e. a continuous glass fibre bundle previously impregnated with a resin, is wound onto a rotating rigid mandrel in a pre-determined geometrical pattern, and after attaining an appropriate base and thickness on the mandrel the resin is hardened irreversibly by the action of a catalyst system, and optionally, heating. Thereafter the mandrel is removed from the resulting hardened wound structure. The glass fibres cross each other in the wound structure at an appropriate angle, forming a wall stucture with high tensile strength. The wound structures contain a relatively high amount, i.e. about 50 to 70 per cent by weight, of glass fibre.

The glass-reinforced resins, generally glass-reinforced polyester resins can be regarded as ideal structural materials for the production of containers, since they possess appropriate strength characteristics: tensile strength: $\sigma_B = 5500$ kg./cm$^2$., elastic modulus: E $2\times10^5$ kg./cm. 2. (with 60% parallel glass fibre reinforcement), have low specific gravity (1.4 to 1.6 kg./dm$^3$.), are resistant to most chemicals, and do not require maintenance. Owing to these advantages glass reinforced plastics are particularly suitable for the production of transport containers, tanks maintained under pressure, underground storing tanks and heat-insulated containers.

In some applications, primarily at underground use, the main load arises from the extrernal pressure. In such instances the low elastic modulus, being about 10 to 20 times lower than that of steel, is, however, very disadvantageous, and thicker walls are required for the appropriate inertia (i.e. rigidity) of the walls. Thicker walls involve, however, a higher weight which is disadvantageous from both technical and economical aspects.

In some instances, e.g. for the transport of foodstuffs, heat-insulated containers are required. In the production of wound structures for this purpose with the conventional technology serious difficulties arise.

All the above problems can be eliminated with the use of wound sandwich structures. As known, a sandwich structure is formed by filling the space between two strong, load-bearing layers or shells with a lightweitht, rigid core material, well adhering to the shells and resisting shear and compressive stresses. Such structures are lightweight and very rigid. As core material, hard plastic foams, such as polyurethane, PVC or polystyrene foams, cage papers (honeycomb papers), shaped bodies, wood, etc. are used.

The sandwich structures are lightweight, rigid, and possess per se good heat insulation properties. Such structures are also commonly applied with cylindrical and wound bodies. Wound sandwich structures can be produced by various technologies. According to one of the known methods the inner shell is wound, thereafter the panelled core material with appropriate thickness and quality is adhered onto the outer surface of the shell, and finally another shell is wound onto the structure.

This method is, however, subject to several disadvantages. From technological aspects, the procedure is time-consuming, sophisticated, and requires much manual work. From statical aspects it is very disadvantageous that the panels stuck onto the external surface of the inner shell never follow the curvature of the object, and adhere to only a part of the entire surface, thus decreasing the strength of the finished article.

Containers with sandwich structure are also prepared from pre-formed inner and outer shells, by fitting the shells and filling the enclosed space with a plastic foam. The disadvantage of this method is that two cores are required for the production.

This invention aims at ensuring a process and apparatus which eliminate the above disadvantages and enable the production of wound sandwich structures with optimum construction and strength in a single technological process, without resorting to manual work.

Thus, in one aspect the invention relates to a process for the production of wound sandwich structures made of glass-reinforced plastics, in which an inner shell composed of glass-reinforced plastic is formed on a rigid shaping mandrel in a known way, preferably with a reeler, then the solid core material of the sandwich structure is wound onto the inner shell in the form of ready-made elements by feeding the elements of the core material onto continuous carrier threads or bands and winding the carrier threads or bands together with the core material onto the inner shell, preferably in a helical pattern, thereby forming a partially or completely coherent core layer on the inner shell; wherein the core elements are adhered to the inner shell with either the still unpolymerized material of the inner shell or an adhesive applied subsequently, thereafter an outer shell, composed of glass-reinforced plastic, is applied in a known way onto the outer surface of the resulting article, and is adhered onto the outer surface of the wound core elements with either its own material or an adhesive applied separately, and the resulting wound sandwich structure is hardened.

According to a preferred embodiment of the process of the invention the core elements are fastened onto the carrier thread or band prior to winding in a steady way, preferably by sticking, nailing or looping, and the thus-obtained carrier threads or bands, provided with the core elements, are applied onto the inner shell.

According to a further advantageous method of the invention several core elements may be combined, preferably adhered to each other or connected with an adhesive tape, to form pre-arranged units, which are transferred onto the carrier threads or bands by the feeding unit, wherein the joints between the individual core elements are disconnected by the feeding unit.

In a further aspect, the invention relates to an apparatus for performing the above process, comprising a unit for storing the core material, a unit for feeding the core material, a unit for storing and straining the threads or bands carrying the core material, a unit to rotate the wound structure, a unit to feed the carrier threads or bands, and a unit to move and control the latter unit.

A preferred embodiment of the apparatus according to the invention comprises also a feeding unit transferring the core elements from the storing unit and simultaneously disrupting the joints between the core elements.

The apparatus according to the invention and the operation thereof is discussed with reference to the attached drawings.

FIG. 2 is the side view of a preferred core element according to the invention.

FIG. 2a is the A—A sectional view of the core element shown in FIG. 2.

FIG. 3 is a sectional view of a further preferred core element according to the invention.

FIG. 3a is the top view of the core element shown in FIG. 3.

FIG. 4 is top view of another preferred core element according to the invention.

FIG. 4a is the side view of the core element shown in FIG. 4.

Figure 1:
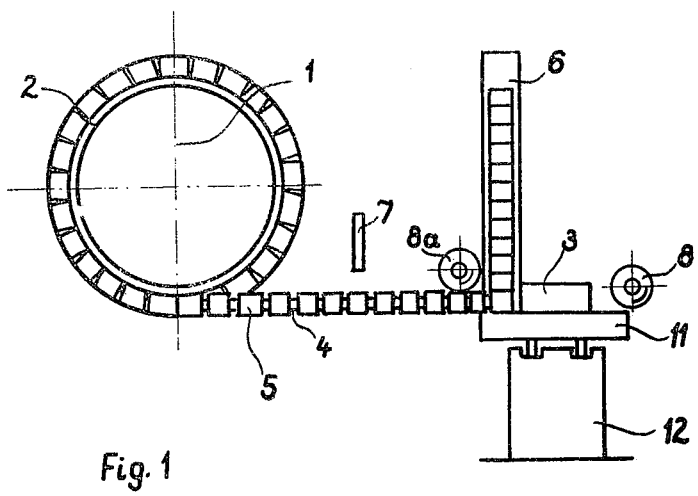
FIG. 1 is a sectional view of a preferred embodiment of the apparatus for performing the process according to the invention.
Figure 1A:
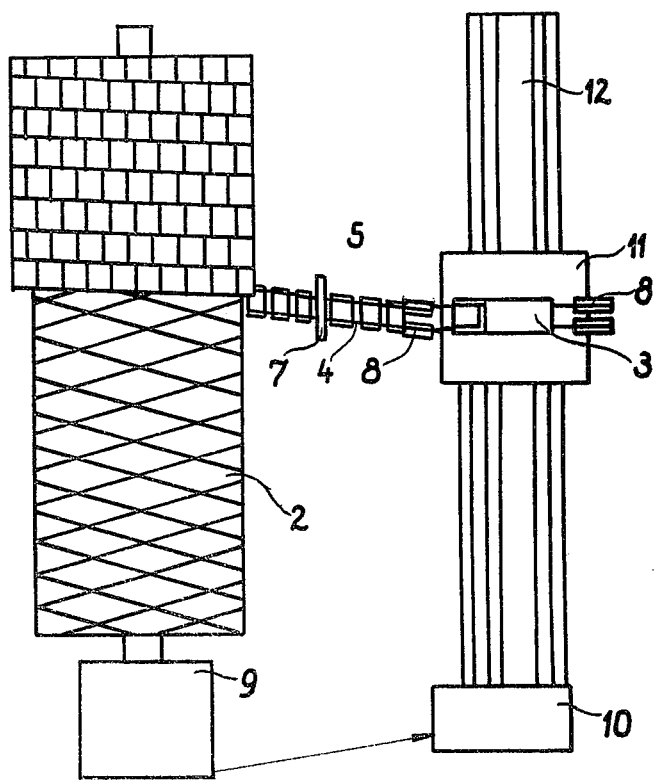
FIG. 1a is the top view of the apparatus shown in FIG. 1.
Figure 5:
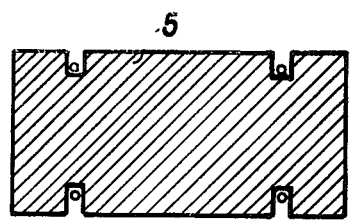
FIG. 5 is a sectional view of a further preferred core element according to the invention.
Figure 5A:
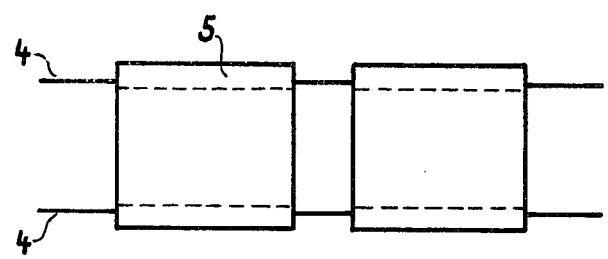
FIG. 5a is the side view of the core element shown in FIG. 5.
Figure 5B:
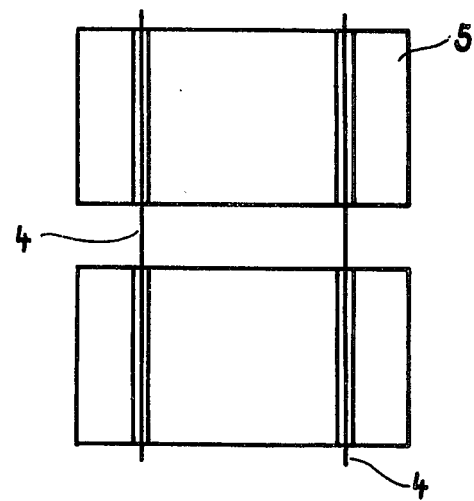
FIG. 5b is the top view of the core element shown in FIG. 5.

In the apparatus according to the invention, the inner shell 2 is prepared by winding in a known manner resin-impregnated glass fibres around the rotating mandrel 1. Thereafter core elements 5 are wound, along with carrying and stretching threads 4, onto shell 2 so as the threads press the core elements onto the inner shell. The core elements are fed preferably by feeding equipment 3 from storing unit 6 onto carrier threads 4, moving forward at a slight strain from unit 8 (and optionally unit 8a, as well), and pulled by rotating mandrel 1. By moving sledge 11, supporting storage unit 6 and feeding unit 3, parallel to the wound structure, a feed is provided for the carrier threads. The feed must be at least equal to the dimension of one core element along the generatrix, in order to prevent two rows of core element from winding onto each other. The core is driven with driving mechanism 9, whole sledge 11 is driven with feeding mechanism 10. The control of these two mechanisms is preferably interrelated. Sledge 11 moves on bedplate 12. If necessary, an other adhesive layer is applied onto core elements 5 with smearing unit 7. The core elements are applied onto the inner shell in one or more layers, and then the outer shell is formed by conventional winding. Finally, the article is hardened on the mandrel and finished, i.e. trimmed, equipped with pipe ends, lids, etc.

Using this procedure, either completely coherent sandwich wall structures or, if desired, ribbed structures can be produced. A particular advantage of the process is that the core elements need not be adhered separately, since they readily adhere to the still soft, unhardened inner and outer layers. The core material is able to follow accurately the curvature of the mandrel, since it is either produced with the desired profile, or from slightly flexible core material, such as honeycomb. Alternatively, if the core elements are very small, their deviation from the curvature is immaterial.

According to another advantageous method of storing and feeding the core elements, they are joined loosely, as indicated in FIG. 3, by pulling the stretching threads 8 through the holes formed in core elements 5. According to another advantageous embodiment core elements 5 are adhered to band 4 made of threads. In these cases the core elements are stored in wound form, and applied onto inner shell 2 prepared on rotating mandrel 1 by unwinding, covered optionally with resin on their surface by smearing unit 7.

Figure 6:
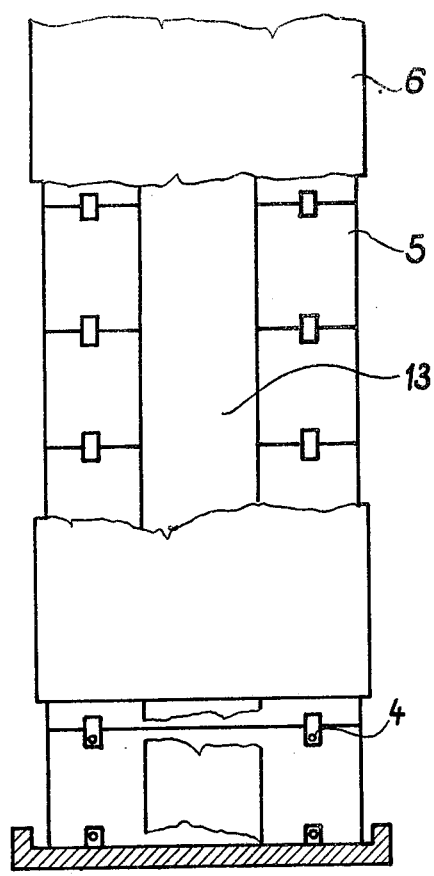
FIG. 6 shows a preferred arrangement of the compiled core elements in the storing unit, and the storing unit in view and partly in section.
Figure 6A:
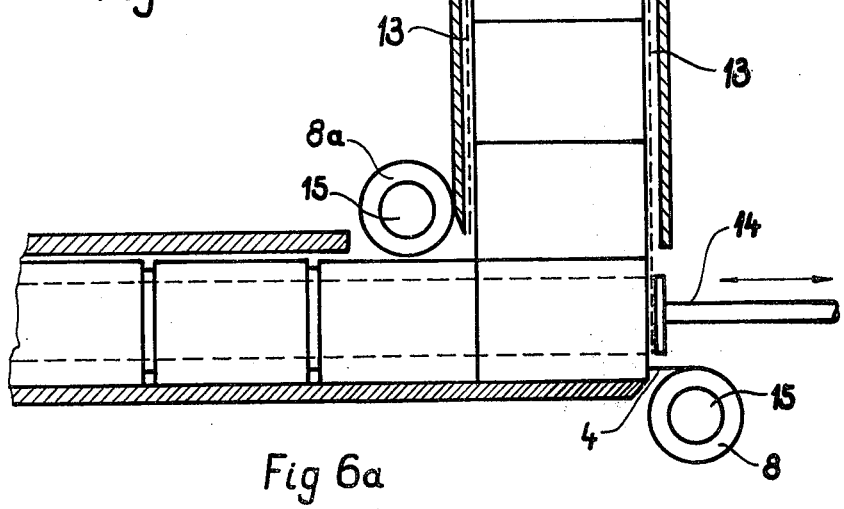
FIG. 6a is a side view and partially a section view of the core elements illustrated in FIG. 6, showing also the units for feeding the core elements and for storing and straining the carrier threads.

According to the invention one may proceed also by fastening together the pre-arranged individual core elements whereby these elements become easier to handle. To this end a large number, e.g. several hundreds, of core elements are placed onto each other, and their interlocking surfaces are adhered together with an adhesive, or they are hitched with adhesive tapes on one or both sides. The resulting bundles of core elements are rigid articles, and thus they are easy to handle. This arrangement is shown in FIGS. 6 and 6a where the bundle of core elements, fastened with adhesive tape 13, is placed into store 6. Carrier thread 4, unwound from storage and damping drums 8 or 8a, respectively, is led below the store. Feeder 14, with piston-like alternating movement, exerts a pressure onto the lowermost core element, disconnecting it from its neighbour by tearing adhesive tape 13, and simultaneously pushes the core element onto carrier threads 4 moving forward continuously. Thereafter the feeder returns into its initial position, the bundle of core elements slips in the store downwards, and the feeder is ready to feed the next core element.

The invention is further elucidated by the aid of the following non-limiting examples.

EXAMPLE 1

A cylindrical hollow body, 1600 mm. in diameter and 6000 mm. in length, is prepared on a conventional winding machine. Winding is performed with glass roving and polyester resin. 1.5 % by weight of benzoyl peroxide, ensuring a hardening temperature above 60°C, are added to the polyester resin. The wall thickness of the wound cylindrical shell is 4 mm. Thereafter, without removing the mandrel from the machine and cutting the glass rovings, the core elements in the storing unit mounted on a winding sledge are fed continuously onto bands formed by the rovings stretched between the impregnating vat and the mandrel. The band formed from the rovings is 200 mm. in width, and the dimensions of the core elements are as follows: width: 240 mm., thickness: 20 mm., length: 40 mm. A 241 mm. feed is set on the machine, whereby the core elements are wound continuously to form a spiral with a pitch of 241 mm. on the still soft, unhardened inner shell. After winding up the core elements, without disconnecting either the mandrel or the rovings, winding is continued according to an appropriate re-adjusted program to form the outer shell. An outer shell, 4 mm. in thickness, is formed. Thereafter the rovings are cut off, the sandwich structure is placed into a furnace for heat treatment, and hardened at 60°C for 4 hours, thereby providing a rigid connection between the inner shell, the core elements wound onto it, and the outer shell.

The resulting sandwich-structured container is 5 to 6 times more rigid than a container with a wall thickness of 8 mm., made of the same amount of the same conventional glass-reinforced plastic.

EXAMPLE 2

One proceeds as described in Example 1, with the difference that the roving threads are cut off after the formation of the inner shell. Thereafter ready-made core elements, connected to each other with polyamide threads and stored in coiled form, are wound onto the inner shell, by unwinding from the storage coil and passing through the deflectors mounted onto the sledge of the winding machine, at an appropriate feed. Finally, the conventional winding is resumed to prepare the outer shell. Further on one proceeds as described in Example 1.

The obtained product, similarly to that prepared according to the previous Example, is a container with extremely rigid walls, suitable even for underground use, i.e. it is able to bear external pressure.

EXAMPLE 3

Core elements with a thickness of 20 mm., a length of 40 mm. and a width of 240 mm., made of balsawood are piled up, and a row of 200 elements is made by fastening the elements to each other with two bands of 30 mm. wide adhesive tape to their opposite sides. The plane of the tape is perpendicular to the plane of the carrier threads. This rigid bundle is placed into a feeding unit the side walls of which must bear the force necessary to tear the adhesive paper. A piston with a stroke of 45 mm. is arranged below the store. The piston tears off 100 core elements per minute from the bundle stuck with the adhesive tape, and these elements are fed onto the carrier threads. Thereafter one proceeds as described in Example 1.

What we claim is:

1. In a process for the production of wound sandwich structures from glass fiber-reinforced plastic, wherein an inner glass fiber-reinforced plastic layer is wound onto an annular shaping mandrel, and then a central core, and an outer glass fiber-reinforced layer are wound in succession thereover, and wherein the outer layer is subsequently cured, the improvement which comprises attaching a plurality of individual prefabricated nonfilamentary block-like core elements to a continuous carrier to form a continuous succession of said elements before the application thereof over the inner layer by helically winding said core elements over said inner layer.

2. The process of claim 1, wherein said core elements are adhesively secured to the outer surface of the inner layer.

3. The process of claim 1, wherein said core elements are adhesively secured to the outer surface of the inner layer by the application of an adhesive.

4. The process of claim 1, further comprising the step of temporarily connecting a plurality of said core elements into a temporary continuous unit, and then individually connecting successive elements of said temporary continuous unit with said continuous carrier means, and individually disconnecting said core elements from said temporary continuous unit.

5. The process of claim 4, wherein said step of temporarily connecting said core elements together by adhesive means.

6. The process of claim 5, wherein said adhesive means comprises an adhesive tape.

7. The process of claim 1, wherein said continuous carrier means comprises threads or tapes.

* * * * *